United States Patent Office 3,223,681
Patented Dec. 14, 1965

3,223,681
POLYMER COMPOSITIONS FROM AN ALKYLEN-
IMINE DERIVATIVE, A DICARBOXYLIC ACID
ANHYDRIDE AND WATER
George M. Rambosek, Maplewood, Minn., assignor to
Minnesota Mining & Manufacturing Company, St. Paul,
Minn., a corporation of Delaware
No Drawing. Filed Oct. 24, 1960, Ser. No. 64,256
9 Claims. (Cl. 260—77.5)

This invention relates to a novel, one-part fluid system which can be cured by contact with water or its equivalent. In one aspect this invention relates to a new liquid adhesive composition which is readily cured upon contact with moisture.

Various adhesives have recently become commercially available which rapidly cure to form a relatively tough, water resistant bond. These adhesive compositions have assumed considerable importance in such applications as require a firm wood-to-wood or wood-to-metal bond. The bonding of glass, metal and various plastic compositions have also been achieved by such compositions. Although the resultant bonds have been generally outstanding, these systems have had several serious disadvantages. Many of the most satisfactory adhesive systems, e.g., epoxy resins, require a blending of base compound and catalyst or activator prior to application, thereby initiating the curing reaction. Such two-part systems are inconvenient to use and necessitate undesirable on-the-job blending techniques. For certain uses, as in dental cements, maximum bonding properties have been achieved only by permitting the cement to cure in a relatively moisture free environment. Moreover, the shelf life or stability at room temperature has in some cases been so short as to require rapid marketing and use of these systems. Such two part systems additionally have involved waste arising out of disruptions in production and miscaluculation of requirements.

It is therefore an object of this invention to provide a fluid or flowable one-part composition which can be readily cured upon contact with moisture.

A further object of this invention is to provide a new dental cement or adhesive.

Still another object of this invention is to provide a one-part adhesive composition which can readily be cured with negligible shrinkage to form a tough, water resistant, bond between various materials such as wood (e.g. marine plywood), stone, synthetic resins and elastomers, bone, metals, glass, synthetic and natural fibers, etc.

Yet another object of this invention is to provide a one-part, curable system which can be stored for long periods without curing and which can be subsequently cured upon contact with moisture or its equivalent.

In accordance with this invention a one-part system has been discovered which is readily cured in the presence of moisture at room temperature or slightly elevated temperatures to provide a hard resinous composition with an unusual combination of attributes, including prolonged shelf life, and excellent bonding or adhesive characteristics. This novel one-part system is free of ionizable hydroxyl containing solvents, e.g. water and alcohols, and comprises a stable admixture, essentially homogeneous at room temperature, of an organic acid anhydride which yields at least a dibasic acid upon hydrolysis and an alkylenimine derivative of the formula

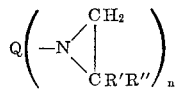

where Q is an n-valent radical, $n$ is at least 2 (preferably 2 or 3), N is preferably linked to an atom having a valence of 4 or 5 (most preferably S, C or P), and R' and R'' are hydrogen or an alkyl group which is preferably a lower alkyl group having from 1 to 6, preferably from 1 to 4, carbon atoms. The bracketed radical is also referred to as an azirane ring or aziridinyl radical. Q may be aliphatic, aromatic or alicyclic organic radical which does not contain an active hydrogen but which may contain atoms other than carbon, such as oxygen, sulfur, nitrogen, etc. Q may also be an inorganic radical, such as

and the organic radical

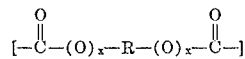

wherein $x$ is either 0 or 1, and R is a divalent aliphatic, aromatic or alicyclic radical which may contain atoms other than carbon, e.g. oxygen, sulfur, etc.

Among the alkylenimine derivatives containing three reactive azirane rings are the N,N',N''-tris-alkylene trimesamides, particularly the tris-1-alkyl-1,2-ethylene trimesamides. Examples of this class include: N,N',N''-tris-ethylene trimesamide; N,N',N''-tris-2-methylethylene trimesamide; N,N',N''-tris-2-ethylethylene trimesamide; N,N',N''-tris-2-propylethylene trimesamide; N,N',N''-tris-2-butylethylene trimesamide; N,N',N''-tris-2-isopropylethylene trimesamide; N,N',N''-tris-2,2-dimethylethylene trimesamide; N,N',N''-tris-2-methyl-2-ethylethylene trimesamide; N,N',N''-tris-2,2-dipropylethylene trimesamide; etc. These compounds are prepared in a manner similar to the bis-1,2-alkylenamides, described later.

The phorsphorus containing alkylenimine derivatives contain at least two aziridine rings and include, for example, tris(1-aziridinyl) phosphine oxide, tris(1-aziridinyl) phosphine sulfide, N,N-diethyl-N',N''-diethylenethiophosphoramide, N,N'-diethylenebenzene thiophosphondiamide, N-(3-oxapentamethylene-N',N''-diethylene phosphoric triamide, N,N'-diethylene benzene phosphondiamide, N,N'-diethylene ethane phosphondiamide, butyl N,N' - diethylenediamidophosphate, N,N'-dioctyl-N',N''-diethylenephosphoric triamide, N,N',N''-tris(1,1-dimethylethylene)phosphoric triamide, etc.

The carboxyl containing alkylenimine derivatives which are particularly preferred have the formula

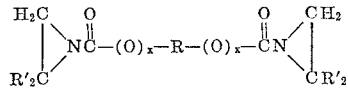

wherein $x$ is either 0 or 1, R' is hydrogen or a lower alkyl group (i.e. a hydrocarbon radical having from 1 to 4 carbon atoms), and R is a divalent aliphatic, aromatic or alicyclic radical. R may contain atoms other than carbon, such as oxygen and sulfur, but does not contain an active hydrogen, i.e. a hydrogen which is active to the Zerewithinoff test (inert to Grignard reagents). When $x$ is 0, the compound is a bis-1,2-alkylenamide. When $x$ is 1, the compound is a bis-1,2-alkylene carbamate.

Bis-1,2-alkylene carbamates and their preparation are described in U.S. Serial No. 850,541, filed November 3, 1959, now U. S. Patent 3,162,617. Generally, their preparation involves the reaction of a 1,2-alkylenimine in a water phase with a solution of a chlorocarbonate of a difunctional alcohol in a water immiscible organic solvent, in the presence of an acid acceptor, at a temperature between about —5° C. and 30° C. The following Example A illustrates the preparation.

EXAMPLE A

A 250 ml. three necked flask was equipped with a stirrer, thermometer, condenser and dropping funnel. To the flask was added a solution of 41.5 grams (0.3 mol) of potassium carbonate in 50 ml. of water, followed by 9.0 grams (0.21 mol) of ethylenimine. This mixture was stirred and cooled to 10° C. A solution composed of 27.5 grams (0.1 mol) of triethylene glycol bis chlorocarbonate in 100 ml. of benzene was then added dropwise to the flask with stirring and cooling over a period of about 18 minutes. The mixture was kept at 10–12° C. during the addition and was allowed to warm to room temperature after the addition had been completed. Stirring was continued for an additional hour. The benzene layer was recovered, dried over a molecular sieve, filtered and evaporated to constant weight under vacuum. 28 grams of a water-white liquid product (which was identified as N,N'-bis-1,2-ethylene (triethylene glycol) carbamate) were obtained, corresponding to a 99% yield thereof. The refractive index ($n_D^{25}$) of this product was 1.4748 and its density ($d_4^{22°}$) was 1.198. Upon analysis, this product was found to contain 9.74% of nitrogen and 0.1% chlorine as compared to calculated values of 9.73% and 0.0% respectively. It is also soluble in a 1:1 weight ratio with water, methanol, isopropanol, methyl ethyl ketone, ethyl Cellosolve, butyl acetate and toluene.

Illustrative of the bis-carbamates which are useful in the one-part systems of the present invention are:

N,N'-bis-1,2-ethylene (1,4-butanediol) carbamate;
N,N'-bis-1,2-propylene (1,4-butanediol) carbamate;
N,N'-bis-1,2-butylene (1,4-butanediol) carbamate;
N,N'-bis-1,2-ethylene (diethylene glycol) carbamate;
N,N'-bis-1,2-butylene (diethylene glycol) carbamate;
N,N'-bis-1,2-ethylene (triethylene glycol) carbamate;
N,N'-bis-1,2-propylene (triethylene glycol) carbamate;
N,N'-bis-1,2-butylene (triethylene glycol) carbamate;
N,N'-bis-1,2-ethylene (polyethylene glycol-200) carbamate;
N,N'-bis-1,2-ethylene (polyethylene glycol-400) carbamate;
N,N'-bis-1,2-ethylene (polyethylene glycol-1000) carbamate;
N,N'-bis-1,2-propylene (polyethylene glycol-1000) carbamate;
N,N'-bis-1,2-ethylene (polyethylene glycol-4000) carbamate;
N,N'-bis-1,2-ethylene (polypropylene glycol-1025) carbamate;
N,N'-bis-1,2-ethylene (polybutylene glycol-500) carbamate;
N,N'-bis-1,2-ethylene [1,1'-isopropylidenebis (p-cyclohexanol)] carbamate;
N,N'-bis-1,2-ethylene [1,1'-isopropylidenebis (p-phenyleneoxy) di-2-propanol] carbamate;
N,N'-bis-1,2-ethylene phenylenoxydiocetamide;
N,N'-bis-1,2-ethylene phenylenoxy carbamate;
N,N'-bis-1,2-ethylene-4,4'-bisphenyl carbamate;
N,N'-bis-1,2-ethylene (1,1'-isopropylidene-bis-phenylene) carbamate;
N,N'-bis-ethylene-resorcinol carbamate; etc.

The preferred aromatic carbamates are represented by the above formula wherein R is 1,3-phenylene, 1,4-phenylene, 1,1'-isopropylidene-bis-phenylene, or 1,1'-isopropylidene-bis-(p-phenyleneoxy) di-2-propanol. The preferred aliphatic carbamates are represented by the above formula wherein R is a branched or straight chain alkylene radical having from about 4 to about 40, preferably from about 4 to about 20, carbon atoms.

Bis-1,2-alkylenamides and their preparation are described in U.S. Serial No. 832,152, filed August 7, 1959, now U.S. 3,115,474; Serial No. 840,255, filed September 16, 1959, now U.S. 3,115,482; and Serial No. 850,330, filed November 2, 1959, now U.S. 3,115,490. Generally, their preparation involves the reaction of an alkylenimine in an aqueous phase with a solution of a dicarboxylic acid halide in a water immiscible organic solvent in the presence of an acid acceptor at a temperature between about −5° C. and 30° C. Illustrative of the N,N'-bis-1,2-alkylenamides in accordance with this invention are N,N'-bis-1,2-ethylenadipamide;
N,N'-bis-ethylenpentadecyladipamide;
N,N'-bis-1,2-butylenadipamide;
N,N'-bis-1,2-ethylenepimelamide;
N,N'-bis-ethylene thipdipropionamide;
N,N'-bis-ethylene oxydipropionamide;
N,N'-bis-1,2-ethylenisosebacamide;
N,N'-bis-1,2-butylenisosebacamide;
N,N'-bis-1,2-ethylensebacamide;
N,N'-bis-1,2-ethylensuberamide;
N,N'-bis-1,2-propylensuberamide;
N,N'-bis-1,2-butylensuberamide;
N,N'-bis-1,2-ethylenazelaamide;
N,N'-bis-1,2-propylenazelaamide;
N,N'-bis-1,2-butylenazelaamide;
N,N'-bis-1,2-ethylendodecanoyldicarboxylic acid amide;
N,N'-bis-1,2-ethylentetradecanoyldicarboxylic acid amide;
N,N'-bis-1,2-propylentetradecanoyldicarboxylic acid amide;
N,N'-bis-1,2-ethylenhexadecanoyldicarboxylic acid amide;
N,N'-bis-1,2-ethylenoctadecanoyldicarboxylic acid amide;
N,N'-bis-1,2-propylenoctadecanoyldicarboxylic acid amide;
N,N'-bis-1,2-propylendodecanoyldicarboxylic acid amide;
N,N'-bis-1,2-pentylensebacamide;
N,N'-bis-1,2-ethylene monadecanediamide;
N,N'-bis-1,2-ethylene-1,4-naphthalenedicarboxamide;
N,N'-bis-1,2-propylene-1,4-naphthalenedicarboxamide;
N,N'-bis-1,2-ethylene-4,4'-bis-phenyl dicarboxamide;
N,N'-bis-1,2-propylene-4,4'-bis-phenyl dicarboxamide;
N,N'-bis-1,2-ethylene hexahydroterephthalamide;
para-(N-1,2-ethylene carboxamidophenyl)-N-1,2-ethylene acetamide;
N,N'-bis-1,2-ethylene isophthalamide;
N,N'-bis-1,1-dimethylethylene isophthalamide;
N,N'-bis-1,2-butylene isophthalamide;
N,N'-bis-1,2-ethylene hexahydroisothalamide; etc.

The preferred aliphatic bis-1,2-alkylenamides are represented by the above formula wherein R is a branched or straight chain alkylene radical having from about 4 to about 40, preferably from about 2 to about 20, carbon atoms. The preferred aromatic bis-1,2-alkylenamides are represented by the above formula wherein R is 1,3-phenylene, 1,4-phenylene, 1,4-naphthalene, or 4,4'-bis-phenyl. The following Example B illustrates the preparation.

EXAMPLE B

N,N'-bis-ethylene isosebacamide is prepared by the reaction of ethylenimine with isosebacoyl dichloride to produce the desired substantially pure monomer, with hydrogen chloride as a by-product. Specifically, it may be prepared as follows: A solution of about 95.6 parts of isosebacoyl dichloride prepared from isosebacic acid dissolved in 400 parts of diethyl ether is added dropwise with cooling and vigorous stirring to a flask containing a solution of 110 parts of potassium carbonate and 43 parts of ethylenimine in 800 parts of water. The temperature of the mixture is maintained below 15° C. and the acid chloride is added at a rate of approximately 1 part per minute. The reaction mixture is allowed to warm gradually to room temperature, while stirring, for an additional hour. During the total reaction period, the pH of the reaction mixture has dropped from approximately 12.5 at the beginning of the reaction to about 8.6 at the end. The ether layer is separated, dried over solid anhydrous sodium hydroxide at 0° C. for 1 hour, the sodium hydroxide is removed by filtration and the ether removed from the filtrate under reduced pressure. The resulting reaction product, N,N'-bis-1,2-ethylenisosebacamide, remains as a water-white liquid.

The acid anhydrides which are employed in the one-part system of this invention are those anhydrides which yield at least a dibasic acid upon hydrolysis. Generally it has been found that the rate of reaction between these anhydrides and the earlier mentioned alkylenimine derivatives is directly proportional to the ionization constant of the acid corresponding to the hydrolyzed anhydride. For rapid setting of the composition a pK value (negative logarithm of the ionization constant of the corresponding acid in water) below about 3 is preferred, although pK values as high as 4.5 and higher have been satisfactory for room temperature cures. Those acid anhydrides having higher pK values are more suitable when somewhat elevated cure temperatures are employed and/or when slower cure rates are desired. Anhydrides of acids with pK values below about 1 are quite reactive with the alkylenimine derivatives, and it is frequently desirable in these cases to retard cure rate by admixing other slower anhydrides, by providing a system with minimum initiating impurities (free radical initiators), etc. Illustrative of suitable anhydrides are maleic, chloromaleic, methyl maleic, succinic, methyl succinic, dodecenyl succinic, octyl succinic methylene succinic (itaconic) nadic, methyl nadic, chlorendic, tricarballylic, trimellitic, pyromellitic, phthalic, tetrahydrophthalic, tetrabromophthalic, tetrachlorophthalic, etc.

Since both the alkylenimine derivatives and acid anhydrides are sensitive to moisture and frequently to hydroxy containing compounds, such as methyl alcohol, and to active hydrogen, it is important that the respective ingredients, as well as the final one-part system, be essentially anhydrous to provide optimum shelf life and to prevent a premature cure. The room temperature cure time in the presence of water varies from a few seconds (e.g. pyromellitic dianhydride or chloromaleic anhydride and N,N'-bis-1,2-ethylene isosebacamide) to about 5 days (e.g. methyl nadic anhydride and N,N'-bis-1,2-ethylene isosebacamide). The extent of reaction for the succinic anhydride increased as the size of the substituent alkyl group increased; however, the reaction rate simultaneously decreased. Although stoichiometric amounts of the polyfunctional anhydride and the bifunctional alkylenimine derivative are usually employed, 30 to 50% excess or more of the alkylenimine derivative may be used, especially to increase the extent of reaction. Maximum reactivity or rate of reaction generally occurs with a 1:1 equivalent weight of imine ring to acid (anhydride) group. Excess acid anhydride tends to decrease reactivity, probably due to chain termination.

In preparing the curable polymer compositions of this invention the desired quantities of anhydrous alkylenimine derivatives and acid anhydrides are thoroughly admixed. Since some of the suitable anhydrides are less compatible or miscible with certain of the alkylenimine derivatives, the ingredients are often blended by using a mutual solvent or by milling at room temperature or higher in order to produce the necessary intimate and essentially homogeneous admixture or dispersion. In addition to the reactive ingredients mentioned above, other elastomers, synthetic and natural resins, fillers, plasticizers, and coloring agents may be included in the composition, depending on the ultimate properties desired in the cured product. Epoxy resins, for example, generally improve the water resistance of the cured product. The properties can be varied considerably by utilizing one or more of the reactants in combination, or by appropriate selection of other additives.

When these compositions are used as adhesives and cements they may be applied directly to the appropriate surfaces and cured by contact with water. Since water serves as activating agent, the surfaces may be wetted prior to application of the adhesive or cement. In fact, it is one of the advantages of these compositions that the surfaces to be bonded or laminated need not be dry, this being an outstanding property when such compositions are used as dental cements or filling compounds. With dental cements heretofore employed, satisfactory results have been obtainable only after the tooth surfaces or cavities have been thoroughly dried. Contact with moist air will also effect a cure, though at a relatively slow rate. In certain instances the water of activation can be incorporated into the composition in the form of a hydrate which loses water at temperatures above room temperature. Illustrative of such a hydrate is sodium borate decahydrate, which loses water at elevated temperatures of about 168° F. Particularly when laminating low heat conductive materials, e.g. wood, the heat liberated by the exothermic reaction is sufficient to liberate water of hydration from the added hydrate and thereby to make the curing reaction self-propagating. In the more usual applications, however, the anhydride and alkylenimine derivatives are admixed with an approximate stoichiometric amount of water immediately prior to use. This amount of water used may vary widely from the preferred approximate stoichiometric amount required to convert the anhydride to the corresponding acid, e.g. as low as about 20% of the stoichiometric amount, but excess water, e.g. more than 50% excess over the stoichiometric amount, is usually avoided. Any exothermic reaction, of course, may result in the loss of water and appropriate compensation may be made for this loss. With the lesser amounts of water, the rate of reaction is correspondingly lower, and the ultimate cure may be limited by the available moisture in the environment.

The degree of brittleness or flexibility of the cured system can be controlled within limits by appropriate selection of the anhydride or anhydrides and/or the alkylenimine derivative or derivatives. Use of various solubilizable anhydride polymers, such as the toluene soluble elastomeric polymer of rubber and maleic anhydride, imparts specific properties to the cured product. Other elastomers may be converted to soluble anhydride rubbers and subsequently reacted with alkylenimine derivatives in a similar manner. The preparation of such soluble anhydride elastomers is illustrated in the literature, see Rubber and Chem. Tech., vol. 19, p. 319 (1946) and vol. 20, p. 938 (1947). Liquid compatible polymers containing anhydride groups which can be converted to the corresponding acid groups in the presence of water and solid anhydride polymers which can be dissolved in a mutual solvent with the alkylenimine derivatives are suitable acid anhydrides within the scope of this invention.

The following examples are presented for purposes of illustration and are not necessarily to be construed as limiting the scope of the invention. All cures are at room temperature unless otherwise indicated.

EXAMPLE 1

Two grams of N,N'-bis-ethylene isosebacamide were mixed with one gram of pyromellitic dianhydride. Two pieces of plywood were soaked in water for several minutes and were coated with this mixture. An overlap bond of one square inch contact surface was clamped into position with a C-clamp. After ten minutes the specimen was tested on the Instron tensile test machine, and a force of 225 pounds per square inch was required to cause rupture. Failure resulted from complete delamination of plywood, the adhesive line remaining intact.

Following a similar procedure the following specimens were prepared and tested:

*Table I*

| Example No | 2 | 3 | 4 | 5 | 6 | 7 |
|---|---|---|---|---|---|---|
| Pyromellitic dianhydride | 3 | 2.5 | 2 | 4 | | |
| N,N'-bis-ethylene isosebacamide | 6 | 6.0 | 6 | 4 | 6 | 3 |
| Poly Bd-PMDA [1] | | 1.0 | 2 | | 1 | 1 |
| Chlorendic anhydride | | | | 6 | 7.5 | 3 |
| Tensile, p.s.i.: | | | | | | |
| Dry | 550 | 460 | 360 | 225 | 180 | 260 |
| Wet | 100 | 90 | | | 65 | 50 |
| Failure: | | | | | | |
| Dry | W | W | WA | A | A | A |
| Wet | A | A | A | A | A | A |

| Example No | 8 | 9 | 10 | 11 | 12 | 13 |
|---|---|---|---|---|---|---|
| Pyromellitic dianhydride | 2.5 | | 2.0 | 2.0 | | 3.0 |
| Poly Bd-chloro maleic [2] | 1.0 | 0.5 | | | | |
| N,N'-bis-ethylene isosebacamide | 6.0 | 3.0 | 6.0 | 4.0 | 12 | 6 |
| Chlorendic anhydride | | 3.75 | | | | |
| Dodecyl succinic anhydride | | | 1.1 | 1.0 | 1.1 | 2.5 |
| N,N'-bis-ethylene sebacamide | | | | 2.0 | | 5.5 |
| Vinyl butyl ethermaleic anhydride [3] | | | | | 1.0 | |
| Bentone 34 [4] | | | | | 0.2 | |
| Cabosil [5] | | | | | 2.0 | |
| Na₂B₄O₇.10H₂O | | | | | | 3.0 |
| Tensile, p.s.i.: | | | | | | |
| Dry | 665 | 220 | 785 | 820 | 435 | 600 |
| Wet | 50 | 280 | 315 | 350 | 250 | 290 |
| Failure: | | | | | | |
| Dry | W | A | W | W | WA | W |
| Wet | A | W | WA | WA | WA | WA |

[1] Liquid copolymer of butadiene and styrene (85:15 mol ratio) plus 20 weight percent pyromellitic dianhydride.
[2] Liquid copolymer of butadiene and styrene (85:15 mol ratio) plus 20 weight percent chloromaleic anhydride.
[3] Rubbery polymer of vinyl normal butyl ether and maleic anhydride prepared by reacting 2 parts of ether and approximately 2 parts of anhydride in the presence of CH₂Cl₂ and azobisisobutyronitrile (18 hours at 50° C.).
[4] Bentone 34 is finely divided dimethyldioctadecyl ammonium bentonite (National Lead Co.).
[5] Cabosil is colloidal silica prepared in a hot gaseous environment by vapor-phase hydrolysis of a silicon compound (Godfrey L. Cabot, Inc.).
Failure: W=wood; A=adhesive.

The preparation of Example 13 illustrates a unique method for incorporating water of activation into the recipe. A hydrate, such as borax decahydrate, is milled into the system. At a temperature of about 168° F. sodium borate decahydred loses eight molecules of water, which then activates the polymerization of the alkylenimine derivative and the anhydride. Such an adhesive, when placed in a dry wood glue line, can be activated by heating one point or edge of the glue line to a temperature above the dehydration temperature. With low heat conductive materials, such as wood, the highly exothermic reaction can be self-propagating through the glue line.

EXAMPLE 14

A concrete block was coated with a composition having the following ingredients:

Parts by weight
N,N'-bis-ethylene isosebacamide _____ 4
N,N'-bis-ethylene sebacamide _____ 2
Pyromellitic dianhydride _____ 1
Dodecyl succinic anhydride _____ 1

The coated block was placed in water with the coated surface above the water line. After 24 days no detrimental effects on the coating were observed, and the coating could not be removed from the concrete surface.

To illustrate the cured systems of this invention with regard to both the rate and the extent of reaction representative runs are set forth in Table II. For purposes of comparison, the extent of reaction was assumed to be represented by the water sensitivity of the cured system. This was determined by hydrolyzing the cured system for 7 days at 180° F. and titrating the water phase, the resulting acid value indicating the amount of carboxy groups freed during hydrolysis. However, the residue material also contained carboxy groups that were not water soluble. When this residue was placed into solution in alcohol, further titration indicated the amount of carboxy groups freed from the residue. The overall extent of reaction was calculated from the combined acid number of the water phase and the residue.

*Table II.—Reaction product data of N,N'-bis-ethylene isosebacamide and anhydride*

| Ex. | Anhydride | Equivalent ratio of alkylenimine derivative/anhydride | Extent of reaction, percent | Rate of reaction (at room temperature) |
|---|---|---|---|---|
| 14 | Methyl maleic | 1/1 | 71.2 | 1-2 days. |
| 15 | Methyl maleic | 1.3/1 | 76.0 | 1-2 days. |
| 16 | Methyl succinic | 1.3/1 | 81.1 | 2-3 days. |
| 17 | C₈ alkyl succinic | 1.3/1 | 88.3 | 2-3 days. |
| 18 | C₁₂ alkyl succinic | 1/1 | 76.3 | >3 days. |
| 19 | C₁₂ alkyl succinic | 1.3/1 | 90.0 | >3 days. |
| 20 | Methyl nadic | 1.3/1 | 93.2 | 5 days. |
| 21 | Tetrahydrophthalic | 1/1 | | 2 days. |
| 22 | Benzoic | 1/1 | | 6 days. |

Other alkylenimine derivatives were also evaluated in terms of reaction speed and the formation of a tack-free cured product. Table III illustrates the reaction of tris-aziridyl phosphine oxide and various anhydrides.

*Table III.—Reaction product data of tris-aziridyl phosphine oxide and anhydride*

| Ex. | Anhydride | Equivalent ratio of alkylenimine derivative/anhydride | Percent H₂O | Reaction speed (minutes) |
|---|---|---|---|---|
| 23 | Chloromaleic | 1/1 | 0 | 0.28. |
| 24 | Dodecenyl succinic | 0.75/1 | 0 | >10. |
| 25 | Maleic | 1/1 | 0 | >5. |
| 26 | Methyl nadic | 0.75/1 | 0 | >10. |
| 27 | Chloromaleic anhydridepentaerythritol adduct | 1/1 | 0 | 1. |
| 28 | Chloromaleic | 1/1 | 10 | 0.11. |
| 29 | ____do | 1/1 | 24 | 0.09. |
| 30 | Dodecenyl succinic | 1/1 | 24 | 3 hours. |
| 31 | Maleic | 1/1 | 24 | 2.40. |
| 32 | Methyl nadic | 1/1 | 24 | 3 hours. |
| 33 | Methyl succinic | 1/1 | 24 | 3 hours. |
| 34 | Pyromellitic dianhydride | 1/1 | 24 | 0.55. |
| 35 | Trimellitic | 1/1 | 24 | 0.63. |
| 36 | Dimethyl butenyl tetrahydrophthalic | 1/1 | 10 | >4 hours. |

Table IV illustrates the use of chloromaleic anhydride with various alkylenimines and mixtures thereof, including the use of added fillers such as titanium dioxide. All systems were evaluated on a basis of 1/1 ratio of reactive azirane ring equivalents to acid equivalents. Ratios in parenthesis are by weight.

*Table IV.—Reaction product data of chloromaleic anhydride and alkylenimine derivative*

| Ex. | Alkylenimine derivative | Reaction speed (minutes) |
|---|---|---|
| 37 | Tris-aziridyl phosphine oxide:N,N'-bis-ethylene isosebacamide (3:7). | 3.0 |
| 38 | Tris-aziridyl phosphine oxide | 1.0 |
| 39 | Tris-aziridyl phosphine oxide:N,N'-bis-ethylene isosebacamide (8:2). | 1.4 |
| 40 | Tris-aziridyl phosphine oxide:N,N'-bis-ethylene isosebacamide (6:4). | 2.0 |
| 41 | Tris-aziridyl phosphine oxide:N,N'-bis-ethylene isosebacamide (4:6). | 3.0 |
| 42 | Tris-aziridyl phosphine oxide:N,N'-bis-ethylene isosebacamide (2:8). | 4.0 |
| 43 | N,N'-bis-ethylene isosebacamide | 20.0 |
| 44 | Tris-aziridyl phosphine oxide:N,N'-bis ethylene sebacamide (8:2). | 1.8 |
| 45 | Tris-aziridyl phosphine oxide:N,N'-bis-ethylene sebacamide (6:4). | 2.5 |
| 46 | Tris-aziridyl phosphine oxide:N,N'-bis-ethylene sebacamide (4:6). | 3.0 |
| 47 | Tris-aziridyl phosphine oxide:titanium dioxide (5:5). | 0.8 |
| 48 | Tris-aziridyl phosphine oxide:N,N'-bis-ethylene isosebacamide:titanium dioxide (4:1:5). | 1.5 |
| 49 | Tris-aziridyl phosphine oxide:N,N'-bis-ethylene sebacamide:titanium dioxide (4:1:5). | 2.5 |

Although, as mentioned earlier, various hydroxy containing initiators, including water, alcohols, etc., can be used to activate the reaction of alkylenimine derivatives and anhydride, water is most effective, since it produces the diacid with the anhydride. Alcohols form monoesters with anhydrides, thus reducing the amount of acid present and causing chain termination.

EXAMPLE 50

The outstanding ability of these curable compositions to adhere to bone has been demonstrated.

A 2/1 weight ratio of pyromellitic dianhydride and dodecenyl succinic anhydride was dispersed in three passes on a paint mill. A second blend of N,N'-bis-ethylene isosebacamide and N,N'-bis-ethylene sebacamide (6/4 weight ratio) was also dispersed by the same technique. Then one part of the anhydride blend was added to 1.2 parts by weight of the alkylenimine derivative blend, with the addition of water in the amount of 5% by weight of the latter. After thorough mixing a hard cured resin was obtained after about 5 minutes.

The above liquid adhesive was successfully used to bond polymethyl methacrylate electrode buttons to the skulls of living rats for brain reaction research. The bone to which the liquid is applied was sponged to remove excess fluid, avoiding complete dryness which would hinder the reaction.

EXAMPLE 51

The curable compositions of this invention have also been found to possess the properties of adhesion and dimensional stability necessary for dental resins and adhesives.

A 2/1 weight ratio blend of pyromellitic dianhydride and dodecenyl succinic anhydride was admixed on a stoichiometric basis (1/1 equivalent basis) with a 2/1 weight ratio blend of N,N'-bis-ethylene isosebacamide and N,N'-bis-ethylene sebacamide. Extracted human teeth were prepared by milling an L-shaped section in each specimen. Aluminum strips were bonded to the sections with this anhydride adhesive of the above composition for test under tensile shear loading. For purposes of comparison an ordinary dental acrylate adhesive was also used.

| Specimen | 1 | 2 | 3 | 4 |
|---|---|---|---|---|
| Wt. percent acrylate adhesive | 100 | 80 | 60 | 40 |
| Wt. percent anhydride adhesive | 0 | 20 | 40 | 60 |
| Shear tensile, p.s.i. | 140 | 400 | 515 | 510 |
| Failure | (¹) | (²) | (³) | (³) |

¹ Adhesive.
² Cohesive and adhesive.
³ Tooth broke.

The data in Table V indicates the relative effect on reaction time (i.e. time taken for one gram sample to become tack-free or to complete reaction, average of three or more samples) of varying ratios of alkylenimine ring/acid equivalent.

penetration of the matrix, and to increase the cure rate. Such thinners and diluents also facilitate coating operations, such as spraying, etc.

Various modifications and alterations in the curable compositions and utility thereof will become apparent to those skilled in the art without departing from the scope of this invention.

I claim:

1. A curing process which comprises contacting with water at about room temperature an essentially anhydrous and normally stable admixture consisting essentially of an organic acid anhydride which yields at least a dibasic carboxylic acid upon hydrolysis and an alkylenimine derivative selected from the group consisting of

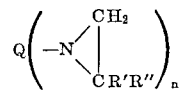

wherein Q is an active hydrogen free radical selected from the group consisting of phosphoryl and thiophosphoryl, and

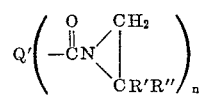

wherein Q' is an active hydrogen free, n-valent radical selected from the group consisting of aliphatic, aromatic and alicyclic radicals, $n$ being from 2 to 3 and R' and R" being selected from the group consisting of hydrogen and a lower alkyl radical.

2. A curing process which comprises contacting water at least at room temperature with an essentially anhydrous, homogeneous and stable admixture of an organic acid anhydride capable of yielding at least a dibasic carboxylic acid upon hydrolysis and N,N'-bis-ethylene isosebacamide.

3. The product of the process of claim 2.

4. A curing process which comprises contacting water at least at room temperature with an essentially anhydrous, homogeneous and stable admixture of an organic acid anhydride capable of yielding at least a dibasic carboxylic acid upon hydrolysis and N,N'-bis-ethylene sebacamide.

5. The product of the process of claim 4.

6. A curing process which comprises contacting water at least at room temperature with an essentially anhydrous, homogeneous and stable admixture of an organic acid anhydride capable of yielding at least a dibasic carboxylic acid upon hydrolysis and N,N'-bis-ethylene (polyethylene glycol) carbamate.

7. The product of the process of claim 6.

8. A curing process which comprises contacting water at least at room temperature with an essentially anhydrous, homogeneous and stable admixture of an organic acid anhydride capable of yielding at least a dibasic carboxylic acid upon hydrolysis and tris-aziridyl phosphine oxide.

9. A curing process which comprises contacting water at least at room temperature with an essentially anhydrous, homogeneous and stable admixture of an organic acid anhydride capable of yielding at least a dibasic car- Table V

| Run | A | B | C | D | E | F | G | H |
|---|---|---|---|---|---|---|---|---|
| Wt, gram, tris-aziridyl phosphine oxide | 0.30 | 0.40 | 0.50 | 0.54 | 0.60 | 0.70 | 0.75 | 0.80 |
| Wt, gram, chloromaleic anhydride | 0.70 | 0.60 | 0.50 | 0.46 | 0.40 | 0.30 | 0.25 | 0.20 |
| Imine ring equivalent | 0.0039 | 0.0052 | 0.0065 | 0.0070 | 0.0078 | 0.0091 | 0.0098 | 0.0104 |
| Acid equivalent | 0.0106 | 0.0091 | 0.0076 | 0.0070 | 0.0061 | 0.0045 | 0.0038 | 0.0030 |
| Imine ring/acid equivalent | 0.37 | 0.57 | 0.86 | 1.0 | 1.3 | 2.0 | 2.6 | 3.5 |
| Average reaction time, minutes | >4.00 | 1.00 | 0.34 | 0.28 | 0.34 | 0.43 | 0.49 | 0.86 |

In addition to the uses set forth earlier, these liquid curable compositions can also be employed as impregnating agents for paper, synthetic and natural fibers and textiles, etc. For impregnating the more dense materials and for improving the compatibility of the ingredients, organic solvents, such as ethyl Cellosolve, methyl ethyl ketone, butyl acetate, etc., can be included in the non-aqueous systems to lower the viscosity or flowability, permit easier drous, homogeneous and stable admixture of an organic acid anhydride capable of yielding at least a dibasic carboxylic acid upon hydrolysis and tris-aziridyl phosphine oxide.

9. A curing process which comprises contacting water at least at room temperature with an essentially anhydrous, homogeneous and stable admixture of an organic acid anhydride capable of yielding at least a dibasic carboxylic acid upon hydrolysis and tris-aziridyl phosphine sulfide.

References Cited by the Examiner

UNITED STATES PATENTS

| | | | |
|---|---|---|---|
| 2,553,696 | 5/1951 | Wilson | 260—2 |
| 3,036,974 | 5/1962 | Trieschamann et al. | 260—2 |

FOREIGN PATENTS

| | | |
|---|---|---|
| 837,710 | 6/1960 | Great Britain. |
| 900,137 | 12/1953 | Germany. |

LEON J. BERCOVITZ, *Primary Examiner.*

H. N. BURSTEIN, *Examiner.*